United States Patent
Frari

[11] 3,807,576
[45] Apr. 30, 1974

[54] LOADER FOR MACHINE TOOLS
[76] Inventor: Adolfo Frari, via Bellfiore 72, Turin, Italy
[22] Filed: Jan. 5, 1972
[21] Appl. No.: 215,459

[52] U.S. Cl. ............................................ 214/1 BD
[51] Int. Cl. .............................................. B66c 1/66
[58] Field of Search... 214/1 BD, 1 BC, 1 BH, 1 BV

[56] References Cited
UNITED STATES PATENTS
3,575,302   4/1971   Cafolla ............................ 214/1 BD
1,933,226   10/1933  Smith .............................. 214/1 BD
3,640,026   2/1972   Flanigan .......................... 214/1 BD
2,979,228   4/1961   Englert ........................... 214/1 BV X
FOREIGN PATENTS OR APPLICATIONS
946,253    1/1964   Great Britain ..................... 214/1 BV

*Primary Examiner*—Gerald M. Forlenza
*Assistant Examiner*—George F. Abraham
*Attorney, Agent, or Firm*—Michael S. Striker

[57] ABSTRACT

The invention concerns a loader for machine-tools, particularly apt to convey ring-shaped pieces, characterized in that it consists of a conveying member which carries towards a working station the pieces to be worked taken at a loading station, and at the same time carries towards an unloading station the worked pieces taken at the working station, this being made by means of a sliding movement along an arc of circumference and of a rotation given to said member by a shaft to which it is solidary.

3 Claims, 4 Drawing Figures

PATENTED APR 30 1974

LOADER FOR MACHINE TOOLS

The present invention relates to a loader for machine tools, particularly to a loader apt to supply a machine with substantially ring-shaped pieces to be worked.

It is an object of the present invention to provide a device which is able to supply the tool with a piece to be worked and to remove at the same time an already worked piece.

The loader according to the invention is characterized in that it consists of a conveying member which carries to a working station the piece to be worked taken at a loading station, and at the same time carries to an unloading station the worked piece taken at the working station, this being made by means of a sliding movement along an arc of circumference and by means of a rotation, these movements being contemporaneous and being given to said member by a shaft to which it is solidary.

According to a preferred embodiment said conveying member consists of two arms, integral and arranged at an obtuse angle, and is solidary to said shaft in correspondence of the vertex of the obtuse angle. According to this embodiment the arms are provided at their ends with pins, hereinafter called loading pins, apt to engage a suitable hole in the ring-shaped pieces, so that it is possible to convey said pieces.

According to another feature of the invention, the shaft solidary to the conveying member can slide axially in both directions so that the loading pins can engage the ring for conveying it or may be disengaged therefrom, so as to release it so that it can be worked and/or unloaded.

Further advantages and characteristics of the invention will become more apparent from the following description, taken in conjunction with the accompanying drawings, in which.

Figure 1:
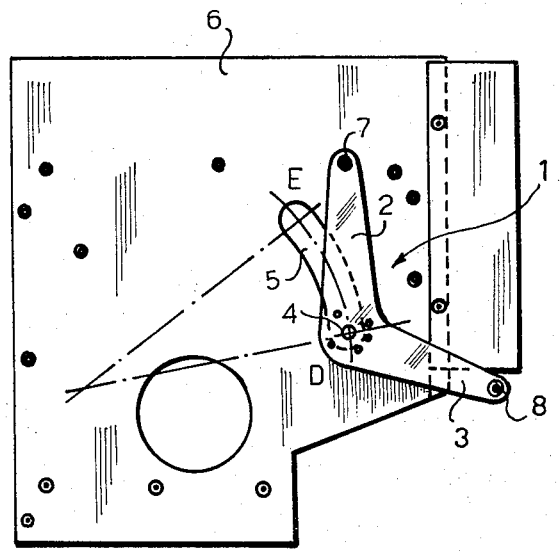
FIG. 1 is a side elevation of the conveying member of a loader according to a preferred embodiment of the invention.

As shown in the drawing (FIG. 1), the conveying member 1 consists of two arms 2, 3 arranged at obtuse angle. Member 1 is solidary in correspondence of the vertex of said angle to a shaft, whose trace is shown at 4. Frame 6 of the machine-tool has a slot 5, shaped as an arc of circumference, wherein the shaft solidary to member 1 can slide. The conveying member is provided, at the ends of arms 2 and 3, with the loading pins whose traces are shown at 7, 8.

Figure 2:
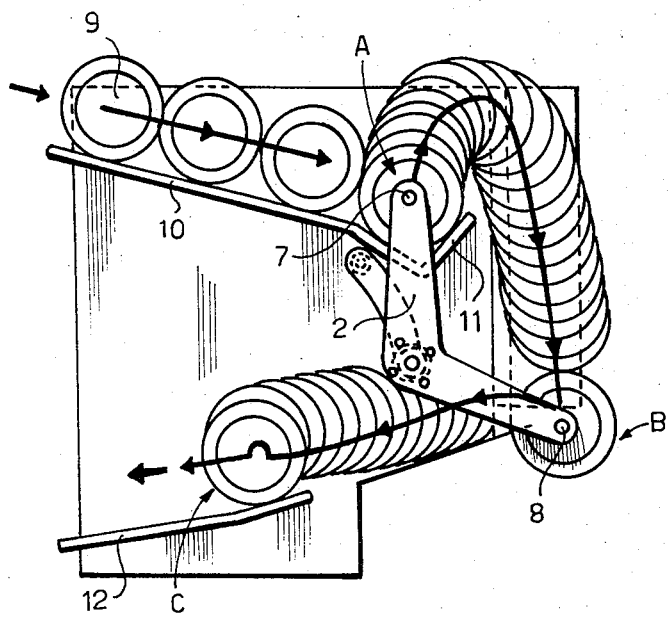
FIG. 2 is a view similar to FIG. 1 and showing the diagram of the motion of the conveying member and of the conveyed ring.

As shown in FIG. 2, pieces 9 to be worked arrive by gravity at the loading station A along a chute 10 provided with a stop 11. The working and unloading stations are shown at B and respectively at C. Another chute 12 allows the worked pieces put down at the unloading station to leave the range of action of the loader. The figure shows also the succession of the positions assumed by the pieces during their conveyance from the loading station A to the working station B, and during their conveyance from the working station B to the unloading station C.

The operation of the conveying member is as follows:

in inactive condition said member is in the position shown in FIGS. 1 and 2: arms 2, 3 have their loading pins 7, 8 in the loading station A and respectively in the working station B, while the shaft to which member 1 is solidary is at the bottom end D of slot 5.

The working cycle of member 1 during the operation of the loader may be divided into two phases, a loading phase and a return phase.

In the loading phase arms 2, 3 take their respective pieces at A and B respectively by means of loading pins 7, 8; member 1 moves in slot 5 from D towards the top end E and at the same time rotates clockwise; the rotation finishes when member 1 has gone along the slot in both directions, that is, when it has gone back from E to D: in these conditions the end of arm 2 is at B and the end of arm 3 is at C.

At this point the shaft is caused to slide axially forward so that the loading pins are disengaged from the conveyed pieces, one of which may thus be worked and the other may go away along chute 12.

As soon as the conveyed pieces are released the return phase begins: member 1 goes again along slot 5 in both directions, and at the same time rotates counter-clockwise, so that arms 2, 3 go back to the position they had in inactive condition. The loading pins remain disengaged from the pieces until the working of each piece lasts. At the beginning of every new loading phase the shaft is returned to its original position, and the loading pins engage the pieces to be conveyed.

Figure 3:
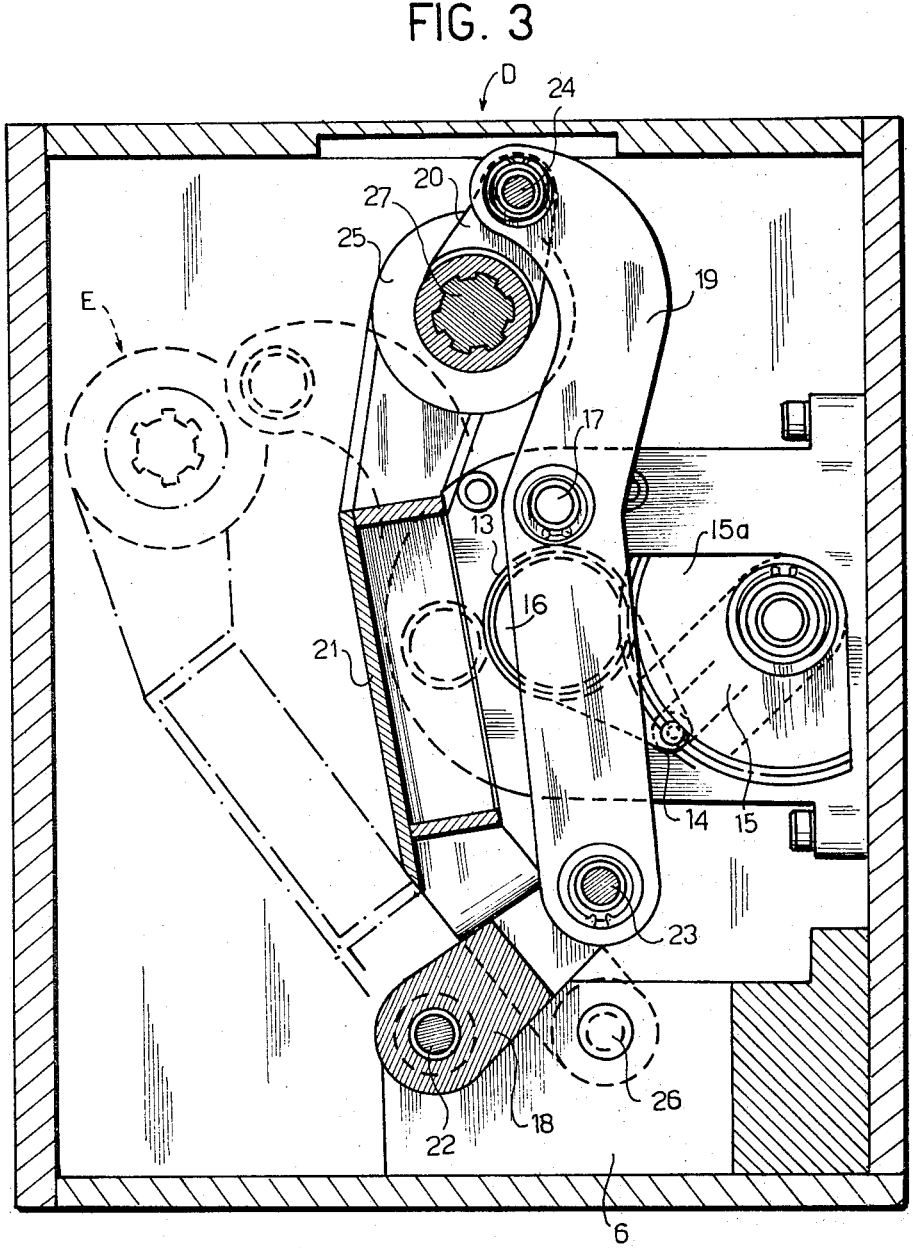
FIG. 3 shows schematically the devices which control the translation and the rotation of the conveying member, according to a preferred embodiment.
Figure 4:
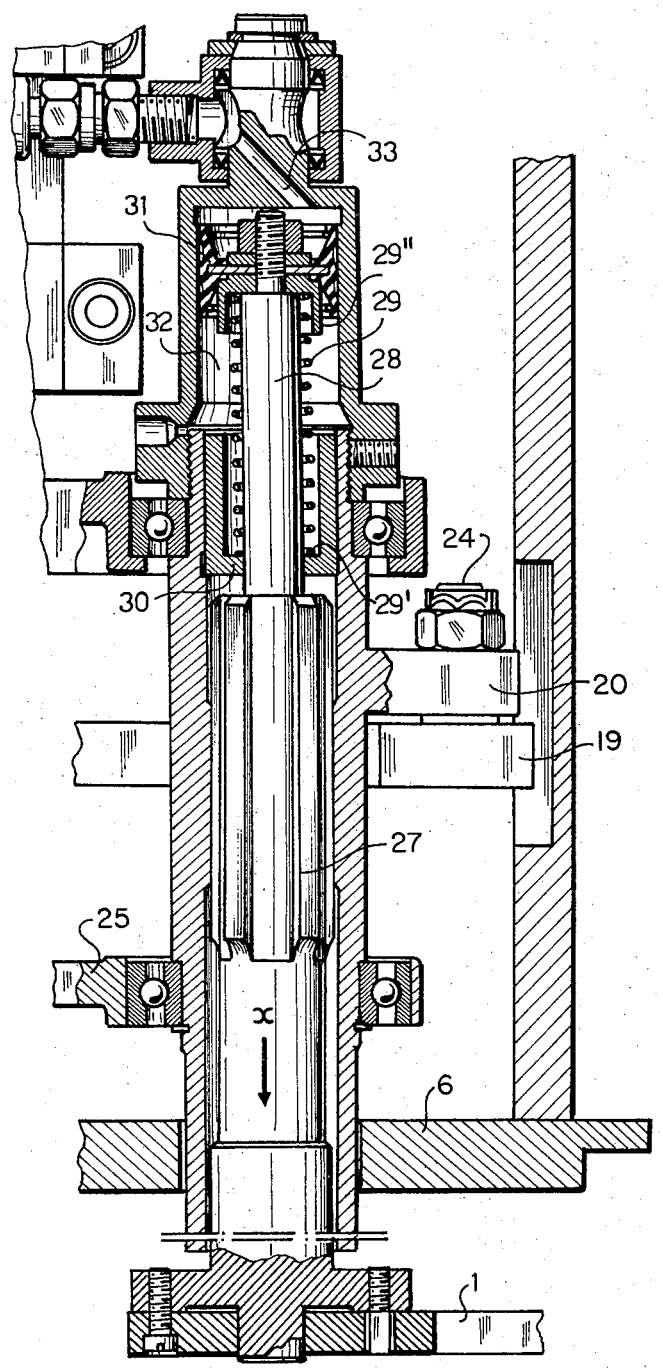
FIG. 4 shows schematically a preferred embodiment of the devices controlling the axial sliding of the shaft solidary to the conveying member.

A preferred embodiment of the means for controlling the movements of the conveying member and of the shaft solidary thereto is shown in FIGS. 3 and 4.

Said means comprises (FIG. 3) a hydraulic motor, whose rotor 13 ends in a cam 14 meshing with a toothed sector 15a with Maltese cross 15, only partially shown in the drawing.

Toothed sector 15a meshes in turn with a crank shaft, whose branch 16 is coaxial to rotor 13 of the hydraulic motor and is freely rotatable therein, whereas branch 17 is solidary to a lever 19, hereinafter called control lever, approximately in correspondence of the middle point thereof. Lever 19 is pivotally connected at one end, by means of a pin 23, to a rod 18, which is, in turn pivotally mounted on frame 6 of the machine by means of a pivot 22.

The other end of lever 19 is connected by means of a pivot 24 to an internally grooved quill 20, to which is pivotally connected at 25 one end of a lever 21, hereinafter called pilot lever; the other end of lever 21 is pivoted at 26 to frame 6 of the machine. Grooved quill 20 and pilot lever 21 are pierced, in correspondence of point 25, by a grooved shaft 27, whose grooves engage the ribs of quill 20.

As shown in FIG. 4, the conveying member 1 is solidary to one end of said shaft, whose other end terminates in a stem 28 around which a spring 29 is wound. End 29' of said spring is in abutment with the wall of a fixed seat 30, whereas end 29'' presses against a piston 31 solidary to stem 28 and seated within a cylinder 32. A feeder not shown in the Figure provides through a line 33 the fluid required for moving piston 31.

The operation of the described devices is as follows: the aforesaid hydraulic motor is arranged so as to allow its rotor 13 to rotate by 90° both clockwise and counterclockwise.

The group of levers 18, 19, 20, 21 forms, together with the line connecting pivots 22, 26, a hinged pentagon which, because of the presence of three fixed points realized by branch 16 of the crank shaft and pivots 22 and 26, will be able to rotate along an arc defined by points D and E.

In inactive position the system is in the position shown at D. During the loading phase the rotor of the hydraulic motor moves counterclockwise by an arc of 90°. Cam 14 moves clockwise the toothed sector 15a with Maltese cross 15 which in turn moves counterclockwise the crank shaft, whose branch 17 is solidary to control lever 19, as it has been said; branch 17 of the crank shaft describes an epicycloid on branch 16 and trails control lever 19 whose movement is passed through grooved quill 20 to pilot lever 21, which trails shaft 27 along arc DE. At the same time the grooved quill, engaging shaft 27, gives it a clockwise rotary motion, consequently rotating clockwise conveying member 1. At the end of the arc of 90° described by rotor 13, the lever group will have described arc DE completely in both directions.

The presence of the toothed sector with Malta cross results in that the speed of the motion of the lever group, and therefore of the rotation of the arms of member 1, is not constant, but increases from the starting positions A and B until half way, and decreases from half way towards the arrival positions B and respectively C.

When the counterclockwise rotation by 90° of rotor 13 has finished, pressure fluid is supplied to cylinder 32 through line 33 by means of a suitable feeder.

Piston 31 will therefore move in the direction of arrow X and will cause stem 28 and shaft 27 to displace axially in the same direction so that the loading pins are disengaged from the conveyed piece. As a consequence of this movement spring 29 is compressed against the end wall of seat 30.

In these conditions the rotation of the hydraulic motor is reversed, so that the whole lever and shaft mechanism will make the same aforesaid movement, but in the opposite direction, so that member 1 will return to the starting position.

Piston 31 will keep shaft 27 axially displaced until the working of each piece lasts. When this working has finished, spring 29 will release and thrust piston 30 towards cylinder top 32 thus allowing the loading pins to engage again the rings to be conveyed.

It is self-evident that the above description discloses only a preferred embodiment of the invention; changes can be made both in the shape of the conveying member, and in the control devices without going out of the scope of the invention.

What I claim is:

1. A loader for machine tools, for example for conveying ring-shaped pieces, in which pieces to be worked are moved from a loading station to a working station and at the same time already worked pieces are moved from the working station to an unloading station, comprising a conveying member for said pieces in form of a single elongated plane element having spaced ends provided with holding means for holding the pieces during the conveyance thereof; a shaft fastened as said element intermediate said ends and extending perpendicular to the plane of said element, said shaft being rotatable and shiftable in the accurate path; first means, including a rotary hydraulic motor and a system of gears and of levers which are connected to one another to form a hinged pentagon, for causing said shaft to rotate while simultaneously being shifted in said path in such a way that the conveying member moves at increasing speed from a starting position until halfway to one of two end positions and moves from halfway to the respective end position at a speed which decreases to zero; and second means for causing said shaft to slide axially in opposite directions so as to allow said holding means to simultaneously engage with the respective already worked pieces and pieces to be worked, or to disengage therefrom.

2. A loader according to claim 1, wherein said second means comprises a piston fast with said shaft for effecting axial sliding thereof in one direction, and a spring compressed by the motion of the piston for effecting axial sliding in the opposite direction.

3. A loader according to claim 1, wherein the hydraulic motor has a rotor which meshes through a cam with a Malthese cross that is carried by a toothed sector, said sector trailing in its movement a crank shaft fixed with a control lever that is pivoted at one end to a rod pivotally mounted on the machine tool, and at the other end to a grooved quill to which there is pivoted one end of a pivot lever the other end of which is pivoted to the machine tool, said shaft extending through said pivot lever and grooved quill where the latter two are pivoted to each other, and the grooves of the quill meshing with ribs provided on said shaft so that the latter rotates while being shifted in said path by said system of levers.

* * * * *